3,671,382
WATER AND HEAT RESISTANT ADHESIVE
Andrew Earl Pierce, Grand Island, N.Y., assignor to
Borden Inc., New York, N.Y.
No Drawing. Filed June 17, 1970, Ser. No. 47,154
Int. Cl. B32b *15/08;* C09j *3/24;* C08f *45/24*
U.S. Cl. 161—214                                11 Claims

ABSTRACT OF THE DISCLOSURE

An aqueous adhesive dispersion containing: casein; a reactive copolymer of vinyl acetate with either methylol acrylamide, a (lower) unsaturated aliphatic acid or a mixture of said acrylamide and acid copolymers: a copolymer of vinyl acetate with a (lower) alpha-olefin; an acid generating salt having a volatile component; a phenylsulfonamide plasticizer for casein; and a sufficient quantity of a volatile alkalizing agent to impart a pH of about 6.5 to 7.5 to said dispersion. The dispersion can be used for laminating metal foil to cellulosic materials.

---

This invention relates to adhesive compositions which are particularly useful in bonding paper or other cellulosic materials to aluminum or other metal foils.

Adhesives for bonding cellulosic material to metal foils are commonly made using synethetic rubber or natural rubber polymers admixed with casein or other stabilizing and adhesive agents. One serious difficulty encountered with laminates made of such adhesive is that the adhesive retains the characteristic odor of the synthetic rubber polymer and this odor, in turn, is carried over into products which come in contact with the laminate. This is particularly objectionable in wrappings or other containers for food products. In order to eliminate the problem of odor retention, various substitutes for the synethetic rubber component have been tried which do not have the tendency for imparting odor in the finished laminate. Polyvinyl acetate emulsions have been tried and prior to this invention had been rejected for such use primarily, because laminates made using adhesive containing polyvinyl acetate and casein lack water resistance at room temperature.

In addition to the lack of water resistance such prior polyvinyl acetate adhesives show a tendency to exhibit cold flow when a laminate is subjected to a tensile force under varying conditions of temperature. For commercial use, an adhesive for laminating metal foil to cellulosic material, e.g. aluminum foil to paper, must have a degree of resistance to cold flow which will allow the laminate to be put through a circulating hot air oven to dry out the water applied in the laminating step prior to rolling up the finished laminate. If the adhesive does not have sufficient resistance to cold flow, it has been found that wrinkling of the aluminum foil occurs as the paper forming part of the laminate is subjected to expansion on contact with the wet adhesive with subsequent contraction upon drying at elevated temperatures.

The present invention provides an adhesive which combines the characteristics of low odor obtained by the use of polyvinyl acetate and yet avoids the lack of water resistance. Additionally, the adhesive of this invention has sufficient warm flow resistance to make it suitable for commercial use when hot air ovens are used to dry the laminate.

The adhesive compositions of this invention are aqueous dispersions containing: casein; a reactive copolymer of vinyl acetate with either methylol acrylamide, a (lower) unsaturated aliphatic acid or a mixture of the said acrylamide and acid copolymers: a copolymer of vinyl acetate with a (lower) alpha-olefin; an acid generating salt of a weak volatile alkali and a strong acid, for example ammonium sulfate, ammonium chloride, ammonium fluoride, ammonium bifluoride, or ammonium silicofluoride, a phenylsulfonamide plasticizer for casein, and a sufficient quantity of a volatile alkalizing agent to impart a pH of about 6.0 to 8.0 and preferably 6.8 to 7.2 to the aqueous dispersion.

The quantity of methylol acrylamide or (lower) unsaturated aliphatic acid copolymerized with vinyl acetate in the reactive copolymers of this adhesive composition, can vary over a wide range such as that of about 1% to 10% of said acrylamide or acid with the remainder 99% to about 90% being vinyl acetate, and optionally minor quantities, e.g., up to about 5% of additional interpolymerizable monomers. Preferably such copolymer will contain from about 2% to 8% of the acrylamide or acid comonomer and 92% to 98% of the vinyl acetate comonomer.

The reactive copolymers used in this invention are preferably incorporated in the dispersion by adding a sufficient quantity of latices of such copolymers.

The casein is preferably incorporated in the dispersion as a solution in the volatile alkalizing agent and water. However, additional alkalizing agents can be employed, e.g., magnesium hydroxide, provided that such nonvolatile alkalizing agent forms a caseinate of low water solubility and does not cause the pH of the aqueous dispersions to rise above a pH of 6.0 without the aid of a volatile alkalizing agent.

The term "(lower)" as used herein and relating to unsaturated aliphatic acids or alpha-olefins, relates to such compounds having from 2 to 6 carbon atoms. Illustrative of the (lower) unsaturated aliphatic acid comonomers which can be used in this invention, there can be mentioned mono- and di-basic acids having from 2 to 6 carbon atoms, e.g., acrylic, methacrylic, itaconic, crotonic and fumaric acids. Illustrative of (lower) alpha-olefin comonomers which can be used in this invention there can be mentioned, ethylene, propylene, butylene-1, and hexene-1; however, ethylene is the preferred alpha-olefin for use in this invention.

The phenylsulfonamide plasticizers are well-known plasticizers for casein. The phenyl group of such plasticizer can be unsubstituted or substituted with one or more aliphatic, non-hydrophilic groups, e.g., alkyls of 1 to 4 carbon atoms, such as methyl, ethyl, propyl, isopropyl, and the like. Preferably the phenyl is substituted with one alkyl, e.g., the methyl group in the ortho- or para-substituted position. The amide nitrogen of said sulfonamide can simply carry two hydrogens or it can be substituted with non-hydrophilic groups such as one or more alkyl groups having from 1 to 4 carbon atoms as in the case of the phenyl substituent, e.g., the amide can be that of N-ethyl, N-methyl, N,N-diethyl, and the like. The preferred sulfonamide plasticizer for use in this invention is a mixture of ortho- and para-substituted N-ethyl toluene sulfonamide.

The volatile alkalizing agent used in this invention is one which volatilizes from the aqueous dispersion at temperatures below about 400° F. Illustrative of such volatile alkalizing agents there can be mentioned ammonium hydroxide and various volatile, water soluble alkaline reacting substituted ammonium compounds.

The proportion of monomers in the vinyl acetate and (lower) alpha-olefin copolymer can vary over a wide range such as that of about 3% to 30% of the olefin copolymerized with 97% to about 70% of vinyl acetate. Preferably the copolymer contains from about 5% to 35% of the olefin and 95% to about 75% of the vinyl acetate. Again, minor quantities, e.g., less than about 5% of other monomers copolymerizable with the primary monomers of this ingredient can also be contained in the polymer. This copolymer is preferably added into the composition as a latex.

The aqueous composition of this invention can be used to laminate metal foil, e.g., aluminum, lead, etc., and cellulosic materials, e.g., paper, wood, etc. by being applied to one or both surfaces which are to be adhered, pressing such surfaces together and either heating the laminate or leaving it set at room temperature until the adhesive forms a firm bond between the substrates. In such process, the adhesive becomes substantially dry. The adhesive dispersions of this invention have good shelf stability. Upon drying, either at room temperature or elevated temperature such as at a temperature of about 300° F. to 400° F., reaction of the various components takes place and increased water resistance is obtained.

The following table shows percentages of ingredients used in this invention both as to permissible and also as to those recommended for commercial use. All percentages recited in this application are on a weight basis, unless clearly indicated to the contrary.

| Components | Permissible | Recommended |
| --- | --- | --- |
| Percent on weight basis: | | |
| Casein | 1–10 | 3–6 |
| Vinyl acetate methylolacrylamide or (lower) unsaturated aliphatic acid copolymer | 5–20 | 8–12 |
| Vinyl acetate-(lower) alphaolefin copolymer | 10–30 | 15–20 |
| Acid generating salt | 0.05–0.5 | 0.1–0.3 |
| Phenylsulfonamide plasticizer | 3–20 | 6–12 |
| Alkalizing agent, as required to obtain pH of | 6.0–8.0 | 6.8–7.2 |
| Water | As required to make 100 parts total | |

For most purposes, the proportions of water to solid materials are selected to make the solids content about 20% to 60% and preferably 30% to 50% of the adhesive dispersion. The higher solids adhesives, e.g., those having 45% or more of solids are particularly useful where lightweight paper is being laminated to aluminum foil. In such case, the proportion of water in the adhesive dispersion would not be so great as to cause excessive distortion of the paper upon contact with the wet adhesive.

The casein provides viscosity control and in addition improves the mechanical stability of the adhesive. The casein has reactive sites which it is believed react with the acid-containing or the methylol group-containing reactive copolymer thus reducing the water sensitivity of the casein and the polyvinyl acetate reactive copolymer to a level lower than that obtained in prior compositions and this allows laminates made from adhesives of this composition to remain bonded securely after soaking in water. To illustrate the criticality of pH, compositions of the ingredients of this invention were made up at relatively low pH such as between 5 and 6. The compositions thus prepared are unstable and become highly viscous over a period of four to six weeks. However, substantially the same compositions which differed only as to a higher level pH, such as between 6.5 and 7.5 and particularly 6.8 and 7.2, remain stable over periods of time exceeding three months. The acid generating salt, for example, ammonium silicofluoride is believed to have a dual function of promoting better adhesion to the foil substrate as well as acting as an acid catalyst for reaction between the casein and the reactive copolymer as the volatile alkali is lost during the drying step.

The invention is further illustrated by the following examples.

EXAMPLE 1

A casein solution is made by mixing together the following materials in the proportions shown:

| | Parts |
| --- | --- |
| Casein | 22.0 |
| Ammonium silicofluoride | 1.3 |
| Ammonia (ammonium hydroxide) | 0.8 |
| Magnesium hydroxide | 0.15 | together with a suitable preservative for the casein and additional water as required to make 100 parts.

The mixture is heated 20 minutes at 180° F. to 185° F. while mixing in order to dissolve the casein component. The casein solution is then cooled to 150° F. and mixed with forty parts of plasticizer, namely, Santicizer No. 8, a mixed N-ethyl ortho- and para-toluene sulfonamide sold by the Monsanto Company. The plasticizer has good compatibility with the casein solution and in addition imparts a thinning or peptizing effect to the casein solution.

In a separate container, polyvinyl acetate emulsions are admixed. One of the emulsions is that of vinyl acetate-methylol acrylamide copolymer containing about 10% of the acrylamide monomer and about 90% vinyl acetate. The other emulsion is of a vinyl acetate-ethylene copolymer containing about 12% ethylene monomer with the remainder of the copolymer being the vinyl acetate monomer. To this mixture is added a small amount of ammonium hydroxide to bring the pH up to about 4.5 to 5.5. Finally to this mixture containing the emulsions is added the casein plasticizer mixture at room temperature. The final composition contains 10% of the plasticizer, 5.5% of casein, 10% of the vinyl acetate-methylol copolymer, 0.3% of ammonium silicofluoride, 20% of the vinyl acetate-ethylene copolymer and the remainder being water with less than about 4% of other minor components. The pH of this final dispersion is 7.0.

Laminates of aluminum foil and paper are made from the dispersion of Example 1 to evaluate the resistance of the laminate to soaking in water and alternately to evaluate resistance of the adhesive to elevated temperatures. In order to approximate the conditions of use commercially, laminates are prepared using a thin spread of adhesive on the paper and the laminate with the aluminum foil is made and rolled together at once to simulate production methods and then dried in an oven at 200° F. for 2 minutes. Upon removal from the oven, adhesion is tested by pulling the aluminum foil away from the paper at a 90° angle thereto. The laminate is then subjected to soaking in water for 16 to 24 hours at room temperature. It is found that adhesives of this invention provide strong bonds to 60 lb. kraft paper when subjected to the soaking as outlined above. Should greater resistance to delamination be required, that is, should fiber-tearing bonds be required, it is preferred to heat the laminate a longer period in the oven at 200° F. or to higher temperatures such as 300° F. to 400° F. in the drying step; or if this is not practical, then the laminate may be aged at room temperature for several days to a week to allow the curing mechanism to increase the wet strength of the adhesive and therefore allow the water resistant composition to become strong enough so as to pull fiber from the paper.

The test for heat resistance is performed by using paper board and aluminum foil laminates. The paper board is used primarily because ordinary lightweight paper is not strong enough to resist the effect of heating in the oven at 500° F. which is the temperature used in the test procedure. Samples for testing heat resistance are laminated as usual but instead of heating in the oven, they are allowed to dry at room temperature for 30 minutes or longer to develop the heat resistance in the laminate. The samples are cut with a bonded area 1" wide by 2" in length and subjected to a peel force using a weight of 150 grams per inch. Samples of laminate made using the adhesive of Example 1 pass a heat resistance test at 500° F. This is judged by the ability of the adhesive to hold the laminate together under stress at 500° F. for a period of 10 minutes or longer.

EXAMPLE 2

A casein solution is made as in Example 1 and mixed with polyvinyl acetate emulsions consisting of a vinyl acetate ethylene copolymer containing about 12% of ethylene with the remainder being vinyl acetate and an acrylic acid-vinyl acetate copolymer containing 4% acrylic acid with the remainder of the monomer being vinyl acetate. The concentration of the various ingredients is as in Example 1, with the vinyl acetate acrylic acid copolymer being substituted for the vinyl acetate-methylol acrylamide copolymer.

From this prepared composition, laminates of aluminum foil and paper are made and tested as in Example 1 and it is found that upon soaking the laminates in water for a period of 16 to 24 hours at room temperature, the adhesive provides fiber-tearing bonds when the laminate is subjected to a force wherein the two substrates are pulled away from each other, the paper being at a 90° angle to the aluminum foil during rupture. The adhesive was tested for heat resistance by laminating paperboard and aluminum foil as in Example 1. It is found that laminates will support a 150-gram weight in peel in an oven at 500° F. on a 1 inch cross sectional area.

A preferred copolymer of vinyl acetate and a (lower) unsaturated aliphatic acid for use in this invention is made according to the following procedure.

| Components | Parts by weight | |
|---|---|---|
| | Permissible | Recommended |
| Vinyl acetate monomer | 40-50 | 44-48 |
| Acrylic acid monomer | 1-5 | 2-4 |
| Polyvinyl alcohol fully hydrolyzed 98% | 3-7 | 4-5 |
| Ammonium persulfate catalyst | 0.05-1.0 | 0.1-0.5 |
| Water | As required to make 100 parts | |

For the acrylic acid component of the above table there may be substituted other (lower) unsaturated aliphatic acids such as crotonic, methacrylic, itaconic, fumaric acid, and the like. The procedure for preparation of a polymer and latex shown involves adding approximately 10% of the monomeric materials to the reaction vessel containing the suspending agent, namely polyvinyl alcohol. Approximately ½ the catalyst is added and the temperature is raised to 176° F. and reaction allowed to take place for 20 to 30 minutes after which the remaining portions of the monomeric materials and catalysts are metered in proportionately over a period of several hours, the reaction being complete in approximately 5 to 6 hours.

Preferred methylol acrylamide-vinyl acetate copolymer emulsions can be made in much the same way as described above for the (lower) unsaturatel aliphatic acid except that methylol acrylamide is used to replace the acrylic acid or other (lower) unsaturated aliphatic acid component. Of course, ammonium persulfate catalyst can be replaced with other conventional free radical producing catalysts such as potassium persulfate or sodium persulfate.

EXAMPLE 3

A casein solution was made as in Example 1 and combined in the same proportions with the remaining ingredients of Example 1 except for the following percentages of ingredients in 3A and 3B individually and the quantity of water required to give 100 parts of dispersion:

3(A)

| | Percent |
|---|---|
| The vinyl acetate-methylol acrylamide copolymer achylamide copolymer used in Example 1 | 7.5 |
| Vinyl acetate-ethylene copolymer used in Example 1 | 25 |

3(B)

| | |
|---|---|
| The vinyl acetate-methylol acrylamide copolymer of Example 1 | 5 |
| The vinyl acetate - ethylene copolymer of Example 1 | 28 |

Although the adhesive formulations of Examples 3A and 3B are within the broad ranges for the concentration of ingredients, upon preparing and testing laminates with this adhesive, it is found that when compared with the formulation of Example 1 water resistance of the foil-paper laminate is reduced in both parts A and B of Example 3 although heat resistance in a laminate made using part A holds 10 minutes in the oven at 500° F. With laminates made using part B, heat resistance is materially decreased since both of the vinyl acetate containing polymers are at or close to the extremes of the permissible concentrations.

EXAMPLE 4

(A) Proportions, ingredients and procedure are same as Example 1, except 5% of sulfonamide plasticizer and 4.4% of casein is used and the pH of the dispersion is only 6.1.

(B) Proportions and ingredients and procedure is the same as in Example 1, except 15% of vinyl acetate-methylol acrylamide copolymer and 15% of vinyl acetate ethylene copolymer and 4.4% casein is used and the pH is 5.5.

(C) Proportions, ingredients and procedure is the same as in Example 1, except 10% of dipropylene glycol dibenzoate plasticizer is used instead of the sulfonamide plasticizer and 4.4% casein is used and the pH is 5.8 of the final dispersion.

Tests on laminates of foil and paper for water resistance compared to results obtained using Example 1 show that similar results are obtained with Examples 4A and 4B laminates. Laminates using Example 4A show good heat resistance; laminates using Example 4B show a decreased heat resistance. Laminates made using Example 4C show poor water resistance and fail the heat resistance test holding only 5 minutes. It should be noted that the formulation as shown in Example 4B shows an unusual and objectionable viscosity rise after 3 weeks again at room temperature from an initial viscosity of 2500 cps. (4/20/80° F. RVF Brookfield) and pH of 5.5 to a viscosity of 11,000 cps. 7/20/80° F.

Example 4C shows that the replacement of the sulfonamide plasticizer with dipropylene glycol dibenzoate plasticizer provides poor water and heat resistance in the foil paper laminates. Example 4B shows that the reactive polyvinyl acetate-methylol acrylamide component in quantities above 12% is not as satisfactory as amount of 12% or less. Of course, these examples are all made at the relatively low pH of 5.5 to 6.1 which is significantly lower than required for best results with viscosity stability of the adhesive. Raising the pH of Example 4B to a pH of 6.8 to 7.2 instead of 5.5 improves viscosity stability on aging 3 weeks at room temperature.

What is claimed is:
1. An aqueous adhesive dispersion containing:
   (a) from about 1% to 10% casein;
   (b) from about 5% to 20% of a reactive vinyl acetate copolymer containing copolymerized therein, per 100 parts by weight of copolymer, about 1 to 10 parts of a member selected from the group consisting of methylol acrylamide, an unsaturated aliphatic acid having from 2 to 6 carbon atoms and mixtures of said acrylamide and acid;

(c) from about 10% to 30% of vinyl acetate copolymer with an alpha-olefin having from 2 to 6 carbon atoms wherein the amount of said olefin copolymerized per 100 parts by weight of copolymer is about 3 to 30 parts;

(d) from about .05% to 0.5% of an acid generating salt of a weak volatile alkali and a strong acid;

(e) from about 3% to 20% of a phenylsulfonamide plasticizer for casein, said plasticizer being selected from the group consisting of unsubstituted phenylsulfonamide and phenylsulfonamides substituted on the phenyl and/or nitrogen with at least one alkyl of 1 to 4 carbon atoms;

(f) and a sufficient quantity of a volatile alkalizing agent to impart a pH of about 6.0 to 8.0 to said dispersion.

2. The adhesive dispersion of claim 1, wherein the acid generating salt is ammonium silicofluoride.

3. A dispersion of claim 1, wherein said alpha-olefin is ethylene and the sulfonamide plasticizer is an alkyl ortho- or para-toluene sulfonamide, said alkyl having from 1 to 4 carbon atoms.

4. The adhesive dispersion of claim 2, wherein said alpha-olefin is ethylene and the sulfonamide plasticizer is an alkyl ortho- or para-toluene sulfonamide, said alkyl group having from 1 to 4 carbon atoms.

5. An adhesive dispersion of claim 4, having a solids content from about 30% to 50% and wherein said dispersion contains from about 3% to 6% casein; 8% to 12% of the reactive copolymer; 15% to 20% of vinyl acetate ethylene copolymer; about 0.1% to 0.3% of ammonium silicofluoride; about 6% to 12% of the sulfonamide plasticizer; and wherein the alkalizing agent imparts a pH of about 6.8 to 7.2 to said dispersion.

6. The adhesive dispersion of claim 5, wherein the reactive copolymer is vinyl acetate-methylol acrylamide.

7. A dispersion of claim 5, wherein the reactive copolymer is a copolymer of vinyl acetate with about 1% to 5% of acrylic, fumaric, itaconic or crotonic acid and the alkalizing agent is ammonium hydroxide.

8. A dispersion of claim 5, wherein the reactive copolymer is that of vinyl acetate and acrylic acid.

9. A dispersion of claim 5, wherein the reactive copolymer is vinyl acetate-methylol acrylamide; the sulfonamide plasticizer is a mixture of N-ethyl ortho- and para-substituted toluene sulfonamide and the alkalizing agent is ammonium hydroxide.

10. A laminate of metal foil and a cellulosic material having a dried adhesive of claim 1 interposed therebetween in adhesive contact with said foil and cellulosic material.

11. A laminate of claim 10, wherein the foil is aluminum and the cellulosic material is paper.

References Cited
UNITED STATES PATENTS

| | | | |
|---|---|---|---|
| 2,186,262 | 1/1940 | Mitchell | 260—30.8 R |
| 2,288,152 | 6/1942 | Bjorksten | 260—30.8 R |
| 2,491,936 | 12/1949 | Schlattman | 260—30.8 R |
| 2,731,433 | 1/1956 | Johnson | 260—8 X |
| 2,754,240 | 7/1956 | Kinney | 260—8 X |
| 3,222,419 | 12/1965 | Jubilee et al. | 260—29.6 WU |
| 3,355,322 | 11/1967 | Worrall et al. | 260—8 X |
| 3,356,627 | 12/1967 | Scott | 260—29.6 RU |
| 3,380,851 | 4/1968 | Lindemann et al. | 260—8 X |
| 3,563,851 | 2/1971 | Armour et al. | 161—251 |

ROBERT F. BURNETT, Primary Examiner

J. C. GIL, Assistant Examiner

U.S. Cl. X.R.

161—216, 218, 228, 229, 232; 260—8, 29.6 RB, 29.6 RW, 885, 897 B

UNITED STATES PATENT OFFICE
CERTIFICATE OF CORRECTION

Patent No. 3,671,382     Dated June 20, 1972

Inventor(s) Andrew Earl Pierce

It is certified that error appears in the above-identified patent and that said Letters Patent are hereby corrected as shown below:

Column 5, line 64, "unsaturatel" should read -- unsaturated --. Column 6, lines 5 and 6, cancel "achylamide copolymer".

Signed and sealed this 28th day of November 1972.

(SEAL)
Attest:

EDWARD M. FLETCHER, JR.        ROBERT GOTTSCHALK
Attesting Officer               Commissioner of Patents